(12) United States Patent
Ukita et al.

(10) Patent No.: US 8,749,376 B2
(45) Date of Patent: Jun. 10, 2014

(54) INFORMATION PROCESSING APPARATUS, INFORMATION PROCESSING METHOD, PROGRAM, STORAGE MEDIUM, AND INFORMATION PROCESSING SYSTEM

(75) Inventors: Masakazu Ukita, Kanagawa (JP); Masanobu Katagi, Kanagawa (JP); Shiho Moriai, Kanagawa (JP)

(73) Assignee: Sony Corporation, Tokyo (JP)

( * ) Notice: Subject to any disclaimer, the term of this patent is extended or adjusted under 35 U.S.C. 154(b) by 143 days.

(21) Appl. No.: 13/541,259

(22) Filed: Jul. 3, 2012

(65) Prior Publication Data

US 2013/0027200 A1    Jan. 31, 2013

(30) Foreign Application Priority Data

Jul. 25, 2011  (JP) ................................. 2011-162166

(51) Int. Cl.
*G08B 1/08* (2006.01)

(52) U.S. Cl.
USPC ................. 340/539.13; 340/10.32; 340/572.4

(58) Field of Classification Search
USPC ............ 340/539.13, 10.3, 10.1, 572.1, 10.52, 340/10.32, 10.42, 572.4
See application file for complete search history.

(56) References Cited

U.S. PATENT DOCUMENTS 7,876,226 B2 *   1/2011  Oozawa ..................... 340/572.4
2006/0145817 A1 *  7/2006  Aikawa et al. ............... 340/10.3

FOREIGN PATENT DOCUMENTS

JP       2005-352814       12/2005

* cited by examiner

*Primary Examiner* — Toan N Pham
(74) *Attorney, Agent, or Firm* — Oblon, Spivak, McClelland, Maier & Neustadt, L.L.P.

(57) ABSTRACT

There is provided an information processing apparatus including a similar tag list acquiring unit that acquires a similar tag list from which wireless tags having similar tracking information are extracted, a tracker extracting unit that extracts users permitted to access information of the wireless tags included in the similar tag list, a determining unit that determines whether a suspicious tag, which is a wireless tag included in the similar tag list that does not permit the user to access the information of the wireless tag, is included, with respect to each of the extracted users, and a notifying unit that transmits a notification to the user for whom it is determined that the suspicious tag is included in the similar tag list.

8 Claims, 19 Drawing Sheets

FIG. 7

| USER ID | TAG ID | REMARKS |
|---|---|---|
| aa001101 | TX000123, TX000124, TX000133 | BUSINESSMAN A |
| bb001202 | TX000244, TX000245, TX000246, ・・・・ | COMPANY B |
| cc001503 | TX000321, TX000322 | STUDENT C |
| dd002807 | TX000401, TX000478, TX000483, ・・・・ | SCHOOL D |
| ee009909 | TX000150, TX000359 | STALKER E |
| ... | ... | |

FIG. 8

| TAG ID | USER ID OF TRACKER | REMARKS |
|---|---|---|
| TX000123 | aa001101 | TAG CONTRACTED BY BUSINESSMAN A TO BE USED BY HIMSELF |
| TX000124 | aa001101 | |
| TX000133 | aa001101 | |
| TX000150 | ee009909 | TAG OF STALKER E |
| TX000244 | bb001202, aa001101 | TAG PROVIDED FROM COMPANY B TO COMPANY MEMBER |
| TX000245 | bb001202, fg003456 | |
| TX000246 | bb001202, kl005678 | |
| TX000321 | cc001503, aa001101 | TAG OF ELEMENTARY SCHOOL STUDENT C, ALSO TRACKED BY BUSINESSMAN A (GUARDIAN) |
| TX000322 | cc001503, aa001101 | |
| TX000359 | ee009909 | TAG OF STALKER E |
| TX000401 | dd002807, cc001503, aa001101 | TAG PROVIDED FROM SCHOOL D TO STUDENT |
| TX000478 | dd002807, ef001234, gh003456 | |
| TX000483 | dd002807, mn009876, op004567 | |
| ... | ... | |

FIG. 9

| TAG ID | TRACKING INFORMATION |
|---|---|
| TX000123 | ···, (2011/05/09-10:49, NS000345), (2011/05/09-10:54, NS000678), (2011/05/09-11:09, NS000901), (2011/05/09-11:23, NS000234), (2011/05/09-11:44, NS000567), (2011/05/09-11:48, NS000890), ··· |
| TX000124 | ···, (2011/05/09-10:49, NS000345), (2011/05/09-10:54, NS000678), (2011/05/09-11:08, NS000901), (2011/05/09-11:44, NS000567), (2011/05/09-11:49, NS000890), ··· |
| TX000133 | ···, (2011/05/09-10:49, NS000345), (2011/05/09-10:55, NS000678), (2011/05/09-11:09, NS000901), (2011/05/09-11:23, NS000234), (2011/05/09-11:43, NS000567), (2011/05/09-11:48, NS000890), ··· |
| TX000150 | ···, (2011/05/09-10:49, NS000345), (2011/05/09-10:54, NS000678), (2011/05/09-11:08, NS000901), (2011/05/09-11:23, NS000234), (2011/05/09-11:44, NS000567), (2011/05/09-11:48, NS000890), ··· |
| TX000244 | ···, (2011/05/09-10:49, NS000345), (2011/05/09-10:55, NS000678), (2011/05/09-11:23, NS000234), (2011/05/09-11:43, NS000567), (2011/05/09-11:48, NS000890), ··· |
| ··· | ··· |

FIG. 10

| TAG ID | TRACKING INFORMATION |
|---|---|
| ... | ... |
| TX000321 | ..., (2011/07/19-07:39, NS000321), (2011/07/19-07:44, NS000654), (2011/07/19-08:03, NS000987), (2011/07/19-08:13, NS000210), (2011/07/19-08:34, NS000543), (2011/07/19-08:38, NS000876), ... |
| TX000322 | ..., (2011/07/19-07:40, NS000321), (2011/07/19-07:44, NS000654), (2011/07/19-08:03, NS000987), (2011/07/19-08:33, NS000543), (2011/07/19-08:38, NS000876), ... |
| TX000359 | ..., (2011/07/19-07:39, NS000321), (2011/07/19-07:44, NS000654), (2011/07/19-08:03, NS000987), (2011/07/19-08:12, NS000210), (2011/07/19-08:33, NS000543), (2011/07/19-08:38, NS000876), ... |
| TX000401 | ..., (2011/07/19-07:40, NS000321), (2011/07/19-07:44, NS000654), (2011/07/19-08:03, NS000987), (2011/07/19-08:13, NS000210), (2011/07/19-08:33, NS000543), (2011/07/19-08:38, NS000876), ... |
| ... | ... |

FIG. 17

SIMILAR TAG LIST

| TX000123 |
| --- |
| TX000124 |
| TX000133 |
| TX000150 |
| TX000244 |

FIG. 18

TRACKER LIST

| aa001101 |
| --- |
| ee009909 |
| bb001202 |

FIG. 19

TRACKING TAG LIST OF aa001101

| TX000123 |
| --- |
| TX000124 |
| TX000133 |
| TX000244 |
| TX000321 |
| TX000322 |

FIG. 20

NON-TRACKING TAG LIST OF aa001101

| TX000150 |
| --- |

FIG. 21

TRACKING TAG LIST OF ee009909

| TX000150 |
|---|
| TX000359 |

FIG. 22

NON-TRACKING TAG LIST OF ee009909

| TX000123 |
|---|
| TX000124 |
| TX000133 |
| TX000244 |

FIG. 23

TRACKING TAG LIST OF bb001202

| TX000244 |
|---|
| TX000245 |
| TX000246 |
| ... |

FIG. 24

NON-TRACKING TAG LIST OF bb001202

| TX000123 |
|---|
| TX000124 |
| TX000133 |
| TX000150 |

INFORMATION PROCESSING APPARATUS, INFORMATION PROCESSING METHOD, PROGRAM, STORAGE MEDIUM, AND INFORMATION PROCESSING SYSTEM

BACKGROUND

The present disclosure relates to an information processing apparatus, an information processing method, a program, a storage medium, and an information processing system.

Recently, use of wireless tags has increased. A wireless tag maintains a unique ID and the ID is read by a reader. For example, wireless tags are mainly used in the field of a product management. In the field of product management, managers who manage the circulation of products attach wireless tags to the products, associate IDs of the wireless tags and information regarding the products with the wireless tag attached, manage the IDs and the information, and easily manage the circulation of the products (for example, refer to Japanese Patent Application Publication No. 2005-352814).

SUMMARY

Wireless tags are anticipated to obtainable at a low cost and to spread throughout more various fields. Various information including information regarding privacy can be acquired from the wireless tags. For this reason, there has been a demand to develop a mechanism to improve safety in the various fields.

According to an embodiment of the present disclosure, there is provided an information processing apparatus which includes a similar tag list acquiring unit that acquires a similar tag list from which wireless tags having similar tracking information are extracted, a tracker extracting unit that extracts users permitted to access information of the wireless tags included in the similar tag list, a determining unit that determines whether a suspicious tag, which is a wireless tag included in the similar tag list that does not permit the user to access the information of the wireless tag, is included, with respect to each of the extracted users, and a notifying unit that transmits a notification to the user for whom it is determined that the suspicious tag is included in the similar tag list.

According to this configuration, the suspicious tag that may be the wireless tag attached by another person without consent can be detected on the tracking information of the wireless tag and a notification can be transmitted to the user. Thereby, safety in a system using the wireless tags can be improved.

According to another embodiment of the present disclosure, there is provided a program for causing a computer to function as an information processing apparatus which includes a similar tag list acquiring unit that acquires a similar tag list from which wireless tags having similar tracking information are extracted, a tracker extracting unit that extracts users permitted to access information of the wireless tags included in the similar tag list, a determining unit that determines whether a suspicious tag, which is a wireless tag included in the similar tag list that does not permit the user to access the information of the wireless tag, is included, with respect to each of the extracted users, and a notifying unit that transmits a notification to the user for whom it is determined that the suspicious tag is included in the similar tag list.

According to another embodiment of the present disclosure, there is provided a computer readable recording medium that records a program for causing a computer to function as an information processing apparatus which includes a similar tag list acquiring unit that acquires a similar tag list from which wireless tags having similar tracking information are extracted, a tracker extracting unit that extracts users permitted to access information of the wireless tags included in the similar tag list, a determining unit that determines whether a suspicious tag, which is a wireless tag included in the similar tag list that does not permit the user to access the information of the wireless tag, is included, with respect to each of the extracted users, and a notifying unit that transmits a notification to the user for whom it is determined that the suspicious tag is included in the similar tag list.

According to another embodiment of the present disclosure, there is provided an information processing system which includes wireless tags that maintain tag identifiers for identifying the wireless tags, a reader that acquires the tag identifier when there is a wireless tag within a predetermined range, and an information processing apparatus that inspects information of the wireless tag based on tracking information showing a movement history of the wireless tag generated using a time at which the tag identifier is acquired by the reader. The information processing apparatus includes a similar tag list acquiring unit that acquires a similar tag list from which wireless tags having similar tracking information are extracted, a tracker extracting unit that extracts users permitted to access information of the wireless tags included in the similar tag list, a determining unit that determines whether a suspicious tag, which is a wireless tag included in the similar tag list that does not permit the user to access the information of the wireless tag, is included, with respect to each of the extracted users, and a notifying unit that transmits a notification to the user for whom it is determined that the suspicious tag is included in the similar tag list.

According to the embodiments of the present disclosure described above, safety in a system using the wireless tags can be improved.

BRIEF DESCRIPTION OF THE DRAWINGS

FIG. 7 is a diagram showing an example of user information of the wireless tag tracking system according to the embodiment;

FIG. 8 is a diagram showing an example of tag tracking information of the wireless tag tracking system according to the embodiment;

FIG. 9 is a diagram showing an example of tracking information of the wireless tag tracking system according to the embodiment;

FIG. 10 is a diagram showing another example of the tracking information of the wireless tag tracking system according to the embodiment;

FIG. 17 is a diagram showing an example of a similar tag list extracted in step S305 of FIG. 16;

FIG. 18 is a diagram showing an example of a tracker list extracted in step S309 of FIG. 16;

FIG. 19 is a diagram showing an example of a tracking tag list extracted in step S315 of FIG. 16;

FIG. 20 is a diagram showing an example of a list of similar tags that are not included in a tracking tag list extracted in step S317 of FIG. 16;

FIG. 21 is a diagram showing another example of the tracking tag list extracted in step S315 of FIG. 16;

FIG. 22 is a diagram showing another example of the list of similar tags that are not included in the tracking tag list extracted in step S317 of FIG. 16;

FIG. 23 is a diagram showing another example of the tracking tag list extracted in step S315 of FIG. 16;

FIG. 24 is a diagram showing another example of the list of similar tags that are not included in a tracking tag list extracted in step S317 of FIG. 16;

DETAILED DESCRIPTION OF THE EMBODIMENT(S)

Figure 1:
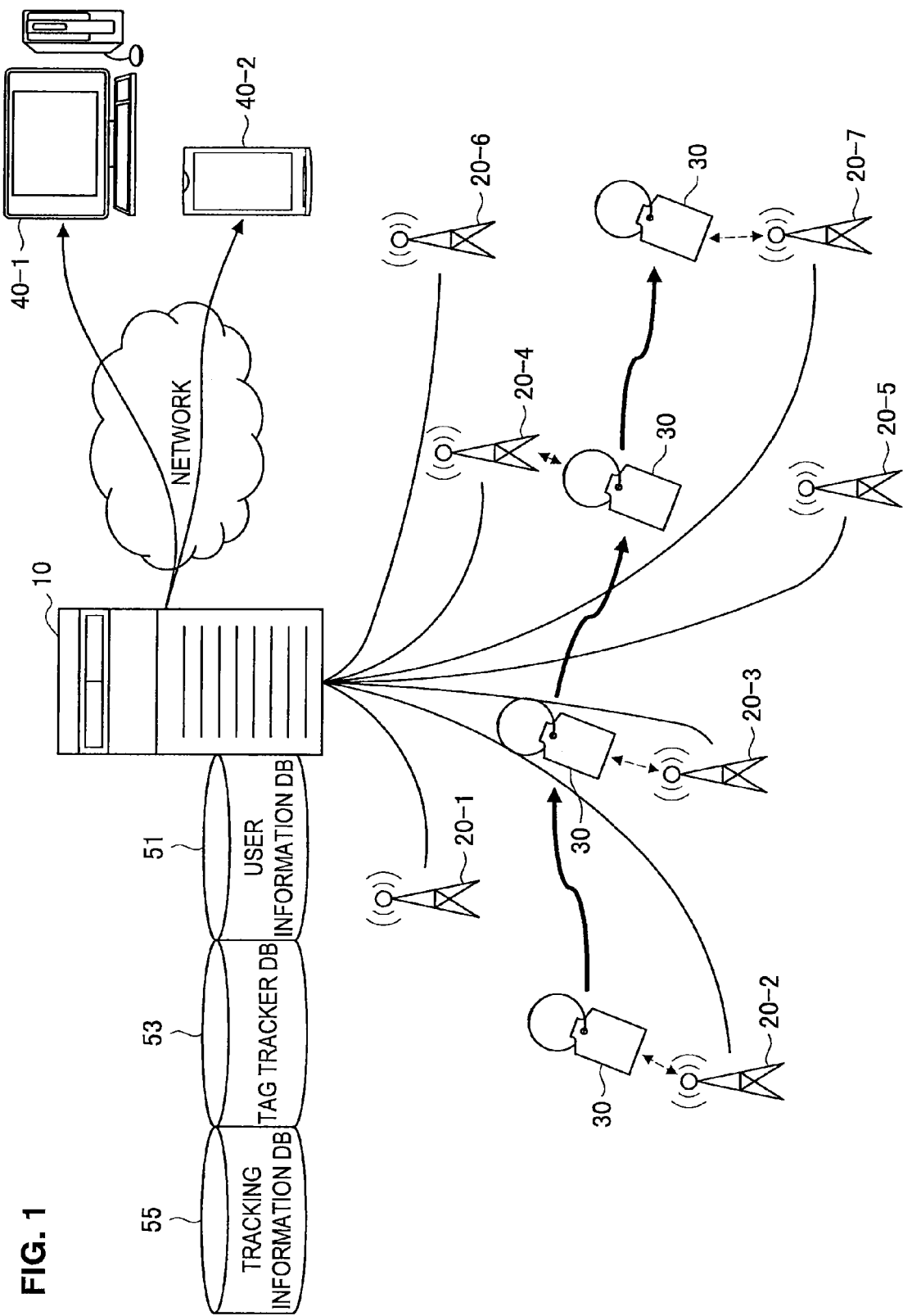
FIG. 1 is a diagram showing a schematic configuration of a wireless tag tracking system according to an embodiment of the present disclosure.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

The following description will be made in the order described below.

1. System Configuration
1-1. Entire System Configuration
1-2. Functional Configuration of Wireless Tag
1-3. Functional Configuration of Reader
1-4. Functional Configuration of Server 2. System Operation
2-1. Outline
2-2. Generation of Tracking Information
2-3. Display of Tracking Information
2-4. Inspection of Tag Information
3. Wireless Tag Confirmation Box In the present disclosure and the drawings, a plurality of structural elements that have substantially the same functional configurations may be denoted with different reference numerals by adding hyphens after the same reference numerals. For example, a plurality of structural elements that have substantially the same functional configurations are distinguished, such as a reader 20-1 and a reader 20-2, according to necessity. However, when it is not necessary to distinguish the plurality of structural elements that have substantially the same functional configurations, the plurality of structural elements are denoted with only the same reference numerals. For example, when it is not necessary to distinguish the reader 20-1 and the reader 20-2, the reader 20-1 and the reader 20-2 are simply called the readers 20.

<1. System Configuration>
[1-1. Entire System Configuration>

First, a schematic configuration of a wireless tag tracking system according to an embodiment of the present disclosure will be described with reference to FIG. 1. FIG. 1 is a diagram showing the schematic configuration of the wireless tag tracking system according to the embodiment of the present disclosure.

A wireless tag tracking system 1 according to the embodiment of the present disclosure mainly includes a server 10, readers 20, wireless tags 30, and terminals 40. A service provider using the wireless tag tracking system 1 sells (or distributes) the wireless tags 30 to a contracted user. The user attaches the wireless tags 30 to his or her possessions of the user and carries the wireless tags. The wireless tag 30 maintains a unique tag ID. User information that includes at least information in which the user and the tag ID are associated is stored in a user information database (DB) 51.

The reader 20 can read the tag ID of the wireless tag 30 when the reader 20 is positioned within the predetermined distance from the wireless tag 30. If the reader 20 acquires the tag ID from the wireless tag 30, the reader 20 transmits the tag ID, time information showing an acquisition time of the tag ID, and a reader ID to identify the reader 20 to the server 10. That is, transmission of the tag ID and the time information showing the acquisition time of the tag ID from the reader 20 means that the wireless tag 30 having the tag ID is positioned near the reader 20 shown by the reader ID at the time shown by the time information. Therefore, a movement history of the wireless tag 30 can be tracked by tracking the time information and the reader ID for each tag ID. The server 10 can generate tracking information using the tag ID, the time information, and the reader ID acquired from the reader 20. The server 10 can store the generated tracking information in the tracking information DB 55.

The user can read the tracking information by connecting the terminal 40 to the server 10 through a network. The tracking information that is registered to permit the user to read the tracking information is tracking information with respect to the wireless tag 30 to be previously registered. Each user can register each user as a tracker of the wireless tag 30 contracted by each user and can register another user as the tracker. By this configuration, the user attaches the wireless tags 30 to important possessions (possessions which the user does not want to lose) and can know the current positions of the possessions when the possessions to which the wireless tags 30 are attached disappear.

For example, when the possession to which the wireless tag 30 is attached moves as shown in FIG. 1, if the distance with the reader 20-2 during the movement of the wireless tag 30 is within the predetermined distance, the wireless tag 30 transmits the tag ID to the reader 20-2. The reader 20-2 transmits an acquired tag ID, time information showing an acquisition time of the tag ID, and a reader ID to identify the reader 20-2 to the server 10. Then, if the distance between the wireless tag 30 and the reader 20-3 is within the predetermined distance, the wireless tag 30 transmits the tag ID to the reader 20-3. Likewise, if the distance between the reader 20-4 and the wireless tag 30 is within the predetermined distance, the wireless tag 30 transmits the tag ID to the reader 20-4. When the distance between the reader 20-7 and the wireless tag 30 is within the predetermined distance, the wireless tag 30 transmits the tag ID to the reader 20-7.

As such, each user can track the locations of his or her possessions by mainly attaching the wireless tags 30 to his or her possessions. For example, parents can read a movement history by attaching the wireless tag 30 to a child's possession. However, when the wireless tag 30 is small, even if the wireless tag 30 is attached to another person, another person may not notice this situation. In this case, the position of the person may be tracked without the person's consent. For example, a stalker may attach the wireless tag 30 to a person or a possession of the person targeted by the stalker and tracking information may help a stalker act. Because the stalker is a user registered as a user of the wireless tag tracking system 1, judging from the wireless tag tracking system 1, the stalker is a regular user. Therefore, the present disclosure suggests a method of extracting a suspicious tag, which is a wireless tag 30 attached by an unjust user who attaches the wireless tag 30 to another person or a another person's possession without the other person's consent and tracks the other person or the other person's possession to achieve an unjust object, based on wireless tracking information.

[1-2. Functional Configuration of Wireless Tag]

Figure 2:
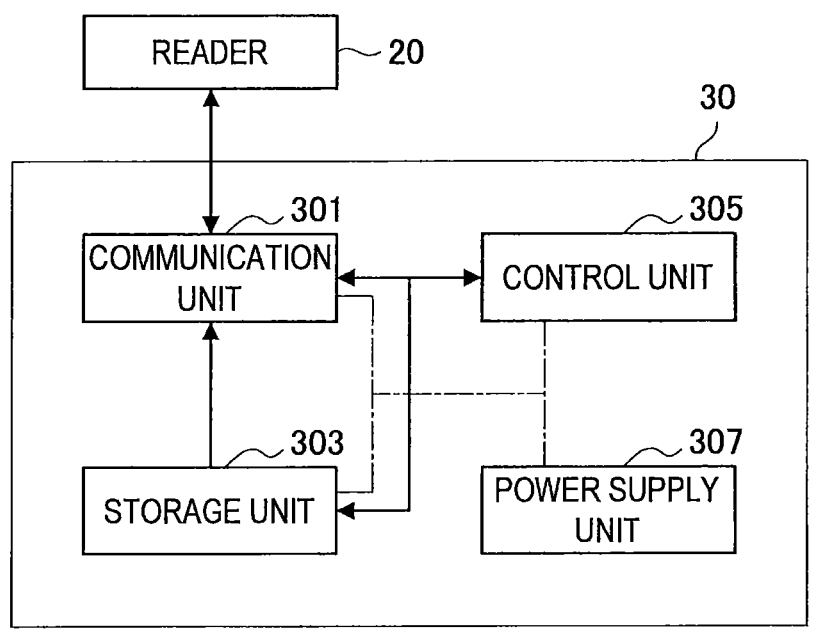
FIG. 2 is a block diagram showing a configuration of a wireless tag according to the embodiment.

Next, a functional configuration of the wireless tag according to the embodiment of the present disclosure will be described with reference to FIG. 2. FIG. 2 is a block diagram showing a configuration of the wireless tag according to the embodiment.

The wireless tag 30 can have a communication unit 301, a storage unit 303, a control unit 305, and a power supply unit 307.

The communication unit 301 is a communication interface that performs communication with the reader 20. When the wireless tag 30 is positioned within the distance that enables communication with the reader 20, the communication unit 301 can transmit a tag ID stored by the storage unit 303 to the reader 20. The communication unit 301 may transmit the tag ID according to an inquiry from the reader 20. The communication unit 301 may transmit the tag ID regularly.

The storage unit 303 is a device for storing data. The storage unit 303 can store a tag ID that identifies the wireless tag 30. The communication unit 301 and the storage unit 303 may be mounted by an integrated semiconductor circuit.

The control unit 305 may be a circuit or a microcomputer and can encrypt transmitted information. The control unit 305 can give an authentication code to the transmitted information. When the control unit 305 responds to the inquiry from the reader 20, the control unit 305 may analyze a content of the inquiry and determine whether the control unit responds to the inquiry.

The power supply unit 307 has a function of supplying power to each unit of the wireless tag 30. For example, the power supply unit 307 may be a battery. Alternatively, the power supply unit 307 may receive power from the reader 20. At this time, the power supply unit 307 may be an antenna that receives the power from the reader 20. The antenna may be used as an antenna that is used by the communication unit 301 to perform communication with the reader 20.

[1-3. Functional Configuration of Reader]

Figure 3:
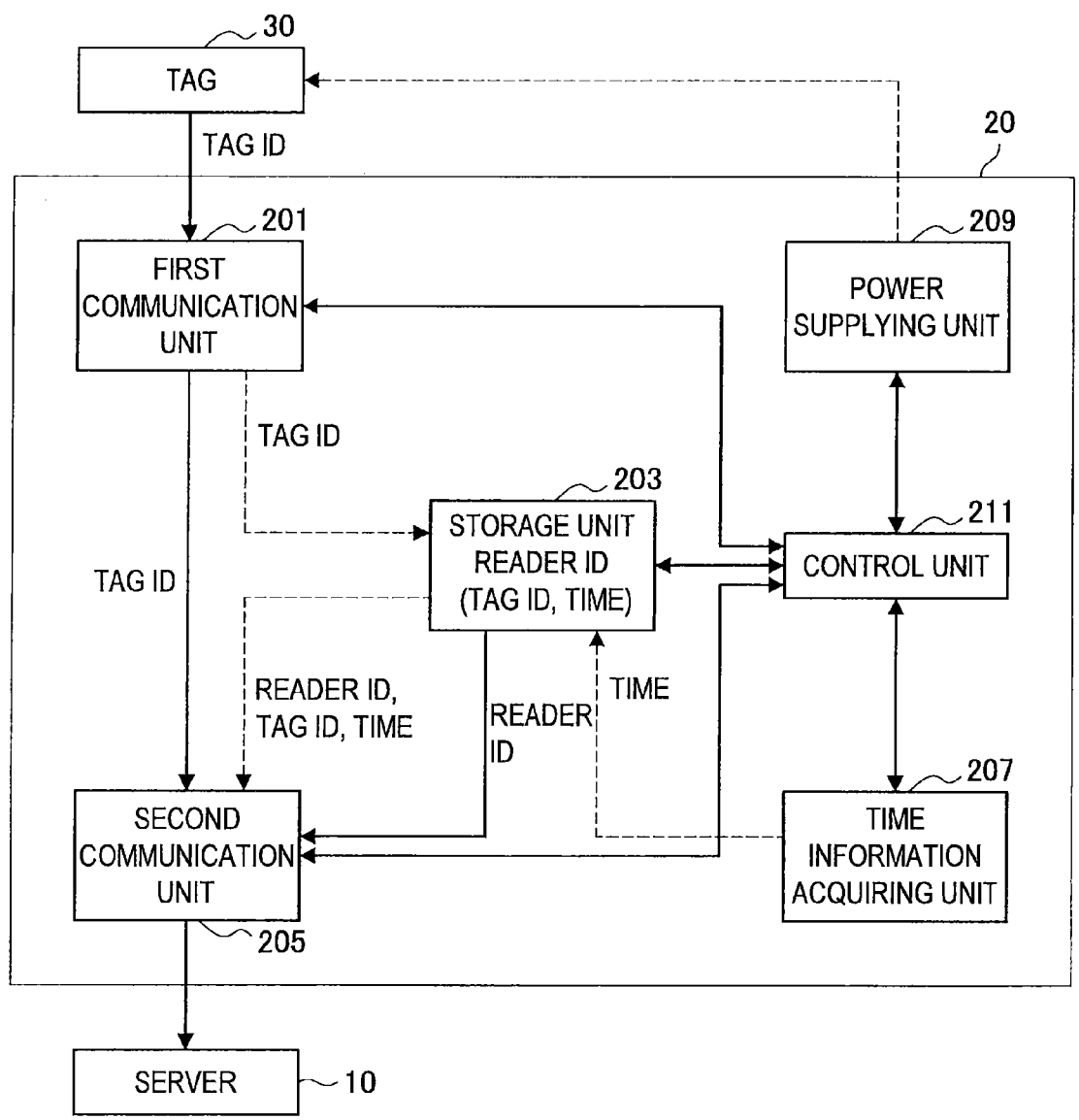
FIG. 3 is a block diagram showing a configuration of a reader that reads the wireless tag according to the embodiment.

Next, the functional configuration of the reader according to the embodiment of the present disclosure will be described with reference to FIG. 3. FIG. 3 is a block diagram showing a configuration of the reader that reads the wireless tag according to the embodiment.

The reader 20 can have a first communication unit 201, a storage unit 203, a second communication unit 205, a time information acquiring unit 207, a power supplying unit 209, and a control unit 211.

The first communication unit 201 has a function of connecting with the tag 30 and acquires a tag ID from the tag 30. The first communication unit 201 can supply the acquired tag ID to the second communication unit 205. The first communication unit 201 may store the acquired tag ID in the storage unit 203. When a sufficient band is secured in communication between the reader 20 and the server 10, the reader 20 may transmit the tag ID and the reader ID to the server 10, whenever the reader 20 acquires the tag ID. The reader 20 can collect the plurality of tag IDs and transmit the plurality of tag IDs to the server 10 by acquiring time information, associating the time information and the tag ID, and storing the time information and the tag ID. In this case, the tag ID is associated with the time information and is stored in the storage unit 203.

The storage unit 203 is a device for storing data and can include a storage medium, a recording device that records data in the storage medium, a reading device that reads data from the storage medium, and an erasing device that erases the data recorded in the storage medium. In this case, a non-volatile memory such as a flash memory, a magnetoresistive random access memory (MRAM), a ferroelectric random access memory (FeRAM), a phase change random access memory (PRAM), and an electronically erasable and programmable read only memory (EEPROM) or a magnetic recording medium such as a hard disk drive (HDD) may be used as the storage medium. The storage unit 203 can store the reader ID to identify the reader 20, as described above. The storage unit 203 can associate the tag ID acquired by the first communication unit 201 and the acquisition time of the tag ID and store the tag ID and the time, according to necessity. The tag ID and the time and the reader ID may be stored in a separate storage medium in practice.

The second communication unit 205 has a function of connection with the server 10 and can transmit at least the tag ID and the reader ID to the server 10. The second communication unit 205 may transmit time information showing an acquisition time of the tag ID to the server 10. The second communication unit 205 may transmit the tag ID and the reader ID to the server 10 whenever the first communication unit 201 acquires the tag ID. The second communication unit 205 may collect the plurality of tag IDs and transmit the plurality of tag IDs to the server 10. At this time, the second communication unit 205 associates the plurality of tag IDs, the reader ID, and acquisition times of the tag IDs and transmits the tag IDs, the reader ID, and the acquisition times to the server 10.

The time information acquiring unit 207 has a function of acquiring the time information. The time information acquiring unit 207 may be, for example, a clock. The time information acquiring unit 207 may acquire the time information from an external device.

The power supplying unit 209 has a function of supplying power to the tag 30. The power supplying unit 209 can supply the power to operate the tag 30. Therefore, when the tag 30 is configured to receive the power from the power supplying unit 209, the tag 30 may not have an embedded battery. Meanwhile, when the tag 30 has the embedded battery, the reader 20 may not have the configuration of the power supplying unit 209.

The control unit 211 has a function of controlling an entire operation of the reader 20. The control unit 211 may be a circuit or a microcomputer. For example, the control unit 211 may have a function of encrypting transmitted information or a function of providing an authentication code.

[1-4. Functional Configuration of Server]

Figure 4:
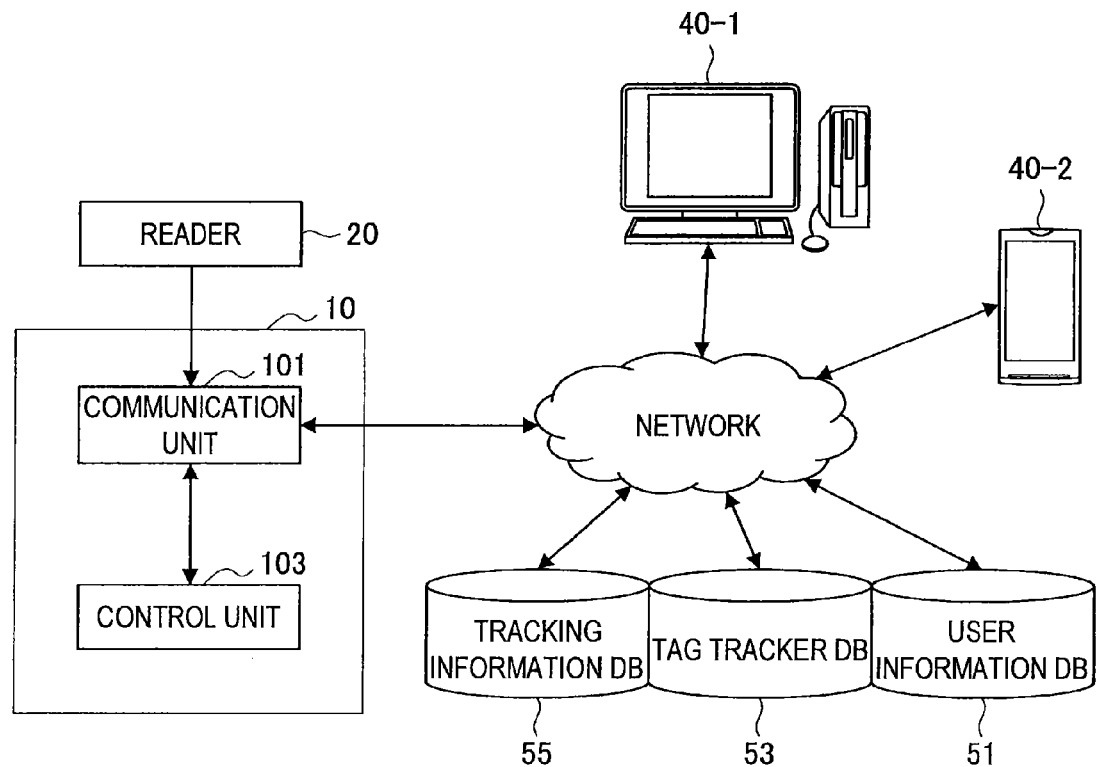
FIG. 4 is a block diagram showing a configuration of a server that manages tracking information of the wireless tag according to the embodiment.
Figure 5:
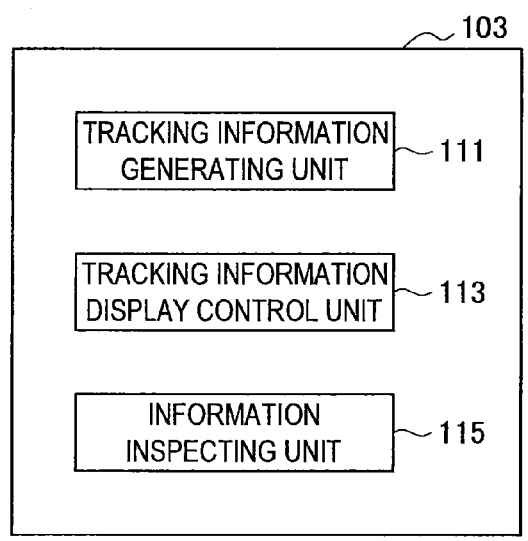
FIG. 5 is a block diagram showing a detailed configuration of a control unit of the server of FIG. 4.

Next, the functional configuration of the server according to the embodiment of the present disclosure will be described with reference to FIGS. 4 and 5. FIG. 4 is a block diagram showing a configuration of the server that manages tracking information of the wireless tag according to the embodiment. FIG. 5 is a block diagram showing a detailed configuration of a control unit of the server of FIG. 4.

First, referring to FIG. 4, the server 10 mainly has a communication unit 101 and a control unit 103. The communication unit 101 has a function of connection with the reader 20. The communication unit 101 can be connected to a terminal 40 through a network. The communication unit 101 can be connected to various databases, according to control of the control unit 103. Examples of the databases to which the communication unit 101 is connected include a user information DB 51, a tag tracker DB 53, and a tracking information DB 55.

The control unit 103 has a function of controlling an entire operation of the server 10. Referring to FIG. 5, the control unit 103 of the server 10 can function as a tracking information generating unit 111, a tracking information display control unit 113, and an information inspecting unit 115.

The tracking information generating unit 111 has a function of generating tracking information of the wireless tag 30 using information of the tag ID and the reader ID supplied from the reader 20. The tracking information generating unit 111 writes the reader ID and the time information to the tracking information DB 55 to manage a date and time and the reader ID for each tag ID based on the tag ID, the reader ID, and the acquisition time of the tag ID to be received, and can generate tracking information.

The tracking information display control unit 113 has a function of displaying the tracking information generated by the tracking information generating unit 111 according to a request from a registered user. When a combination of the user ID and the tag ID is previously registered, the tracking information display control unit 113 can display the tracking information. For example, the tracking information display control unit 113 may display the tracking information of the tag to overlap a map.

The information inspecting unit 115 has a function of inspecting information regarding the wireless tag tracking system. The information inspecting unit 115 can acquire a similar tag list from which a plurality of wireless tags 30 considered as wireless tags attached to the same person or possessions of the same person and moved together are extracted. The information inspecting unit 115 can inspect the possibility of the wireless tag 30 attached by another person being included in the similar tag list against the will of the person to which the wireless tag 30 is attached.

The information inspecting unit 115 may not specify which user the person to which the wireless tag 30 included in the similar tag list is attached is using only information acquired by the wireless tag tracking system. Therefore, the information inspecting unit 115 can transmit a notification to the person to which the wireless tag 30 may be attached by another person against the person's will according to a sequence to be described below.

First, the information inspecting unit 115 acquires the similar tag list from which the wireless tags 30 having similar tracking information are extracted. The information inspecting unit 115 may calculate similarity degrees of the tracking information between the wireless tags 30, extract the wireless tags 30 of which the similarity degrees are a predetermined threshold value or more, and generate the similar tag list. Alternatively, the information inspecting unit 115 may acquire a similar tag list that is generated by a separate device. At this time, an algorithm that is used to calculate similarity degrees of character strings or DNA arrangements may be applied in calculating the similarity degrees. For example, a Levenshtein distance may be used in calculating the similarity degrees. The Levenshtein distance is a value that shows a cost to transform one into the other. Therefore, the value decreases when one becomes similar to the other. When the similarity degree of the tracking information is calculated, a variety of other algorithms may be used. Next, the information inspecting unit 115 can generate a tracker list by extracting a sum of sets of users permitted to access information of the wireless tags included in the similar tag list. The information inspecting unit 115 determines whether a suspicious tag in each user is included in the similar tag list with respect to each of the extracted users (users included in the tracker list). The information inspecting unit 115 transmits a notification to the user for whom it is determined that the suspicious tag is included in the similar tag list. In this case, the user who receives the notification is a user to which the wireless tag not tracked by the user may be attached. Therefore, the information inspecting unit 115 may notify the user that "A wireless tag 30 with which you are not registered as the tracker may be attached to you or your possession."

When the user who receives the notification is unaware of the notification, the user can request the wireless tag tracking system to invalidate or investigate the suspicious tag. The information inspecting unit 115 can receive an invalidation request or an investigation request. If processing for settling the invalidation request is executed, the information inspecting unit 115 can execute processing for invalidating the suspicious tag.

Therefore, the information inspecting unit 115 can function as a similar tag list acquiring unit that acquires the similar tag list from which the wireless tags having the similar tracking information are extracted. The information inspecting unit 115 can function as the tracker extracting unit that extracts the users permitted to access information of the wireless tags included in the similar tag list. The information inspecting unit 115 can function as a determining unit that determines whether a suspicious tag, which is a wireless tag included in the similar tag list that does not permit the user to access the information of the wireless tag, is included with respect to each of the extracted users. The information inspecting unit 115 can function as a notifying unit that transmits a notification to the user for whom it is determined that the suspicious tag is included in the similar tag list. The information inspecting unit 115 can function as a receiving unit that receives the invalidation or the investigation of the suspicious tag. The information inspecting unit 115 can function as an invalidation processing unit that executes the processing for invalidating the suspicious tag.

The example of the functions of the server 10, the reader 20, and the tag 30 according to this embodiment has been described. The structural elements may be configured using general-purpose members or circuits and may be configured using hardware specialized to the functions of the structural elements. The functions of the structural elements may be executed by reading a control program from a storage medium such as a read only memory (ROM) or a random access memory (RAM) storing the control program describing a processing sequence to realize the functions by an arithmetic device such as a central processing unit (CPU) and analyzing and executing the control program. Therefore, the used configuration can be appropriately changed according to a technical level when this embodiment is carried out.

A computer program that realizes the functions of the server 10, the reader 20, and the tag 30 according to this embodiment can be generated and can be mounted on a personal computer. A computer readable recording medium that stores the computer program can be provided. For example, the recording medium may be a magnetic disk, an optical disk, a magneto optical disk, or a flash memory. The computer program may be distributed through the network without using the recording medium.

<2. System Operation>

[2-1. Outline]

Figure 6:
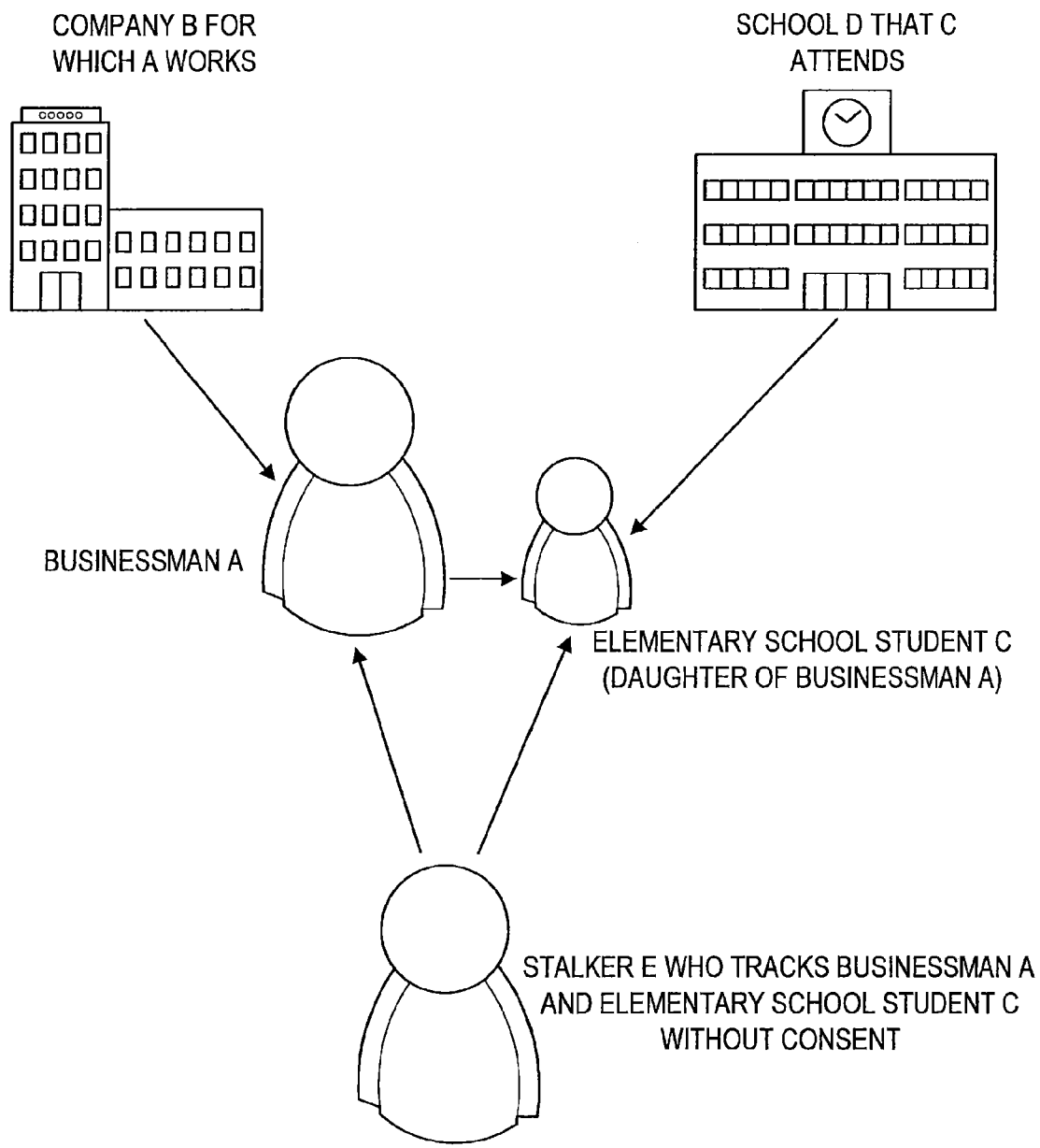
FIG. 6 is a diagram showing a correlative relationship of users who use a wireless tag tracking system according to the embodiment.

In this case, an operation of the wireless tag tracking system according to the embodiment of the present disclosure will be described. First, information used as an example and a corresponding situation will be described with reference to FIGS. 6 to 10. FIG. 6 is a diagram showing a correlative relationship of users who use the wireless tag tracking system according to the embodiment. FIG. 7 is a diagram showing an example of user information of the wireless tag tracking system according to the embodiment. FIG. 8 is a diagram showing an example of tag tracking information of the wireless tag tracking system according to the embodiment. FIG. 9 is a diagram showing an example of tracking information of the wireless tag tracking system according to the embodiment. FIG. 10 is a diagram showing another example of the tracking information of the wireless tag tracking system according to the embodiment.

First, a correlative relationship of users of the wireless tag tracking system in a scenario used in this case will be described with reference to FIG. 6. In this case, five users, a businessman A, a company B, an elementary school student C, a school D, and a stalker E, are shown. Setting of each user is as follows.

The businessman A works for the company B. The businessman A attaches a wireless tag 30 contracted by the businessman A to a possession of the businessman A or a body of the businessman A and uses the wireless tag 30. The businessman A attaches the wireless tag 30 distributed from the company B to the possession of the businessman A or the body of the businessman A and uses the wireless tag 30. The businessman A can track the wireless tag 30 contracted by the businessman A, the wireless tag 30 distributed from the company B, the wireless tag 30 contracted by the elementary school student C, and the wireless tag 30 distributed from the school D and used by the elementary school student C.

The company B distributes a wireless tag 30 contracted by the company B to a businessman who works for the company B. The company B can track the wireless tag 30 contracted by the company B. The company B permits the businessman to which the wireless tag 30 is distributed to track the wireless tag 30.

The elementary school student C goes to the school D. The elementary school student C is a daughter of the businessman A. The elementary school student C attaches the wireless tag 30 contracted by the elementary school student C to a possession of the elementary school student C or a body of the elementary school student C and uses the wireless tag 30. The elementary school student C attaches the wireless tag 30 distributed from the school D to the possession of the elementary school student C or the body of the elementary school student C and uses the wireless tag 30. The elementary school student C can track the wireless tag 30 contracted by the elementary school student C. The elementary school student C can track the wireless tag 30 that is distributed from the school D. The elementary school student C permits the businessman A to be a guardian to track the wireless tag 30 of the elementary school student C.

The school D distributes the wireless tag 30 contracted by the school D to a student who goes to the school D. The school D can track the wireless tag 30 contracted by the school D. The school D permits the student to which the wireless tag 30 is distributed and the guardian of the student to track the distributed wireless tag 30.

The stalker E is an example of an unjust tracker who attaches the wireless tag 30 to a targeted person without consent and tracks the wireless tag 30. The stalker E attaches the wireless tags 30 contracted by the stalker E to the businessman A and the elementary school student C without consent of the businessman A and the elementary school student C and uses the wireless tags 30. The stalker E can track the wireless tags 30 contracted by the stalker E. To attach the wireless tags 30 to other persons without permission of other persons and track other persons is an unjust use method. However, judging from the wireless tag tracking system, the stalker E is a regular user. Therefore, the stalker E can track the wireless tags 30 contracted by the stalker E, even when the wireless tags 30 are attached illegally to the businessman A and the elementary school student C.

Next, an example of user information that is used in this embodiment will be described with reference to FIG. 7. As shown in FIG. 7, the user information includes at least a user ID and a tag ID. The tag ID that is included in the user information is an ID to identify the wireless tag 30 contracted by the user identified by the user ID. A plurality of tag IDs may be associated with one user ID. The user information is stored in the user information DB 51. In FIG. 7, a remarks column is provided. In this case, the remarks column is provided to help with the understanding of contents of the present disclosure and may not be included in the user information in actuality. The user information may include various information regarding the user, in addition to the user ID and the tag ID. For example, the user information may include individual information such as a name, an address, a phone number, and e-mail addresses of the user. Among the user information, the individual information may be stored in a database separate from the user information DB 51.

Next, an example of tag tracking information that is used in this embodiment will be described with reference to FIG. 8. As shown in FIG. 8, the tag tracking information can include a tag ID and a user ID of a tracker permitted to track the wireless tag 30 identified by the tag ID. Similar to the case of FIG. 7, a remarks column shown in FIG. 8 is provided to help with the understanding of contents of the present disclosure and may not be included in the tracker information in actuality. In this case, a plurality of user IDs that are registered as the trackers may be associated with one tag ID. The tag tracking information is stored in the tag tracker DB 53.

Next, an example of tracking information that is used in this embodiment will be described with reference to FIGS. 9 and 10. As shown in FIGS. 9 and 10, the tracking information includes a tag ID, a date and time when the tag ID is acquired by the reader 20, and a reader ID to identify the reader 20 acquiring the tag ID. A plurality of combinations of dates and times and reader IDs may be associated with one tag ID.

[2-2. Generation of Tracking Information]

Figure 11:
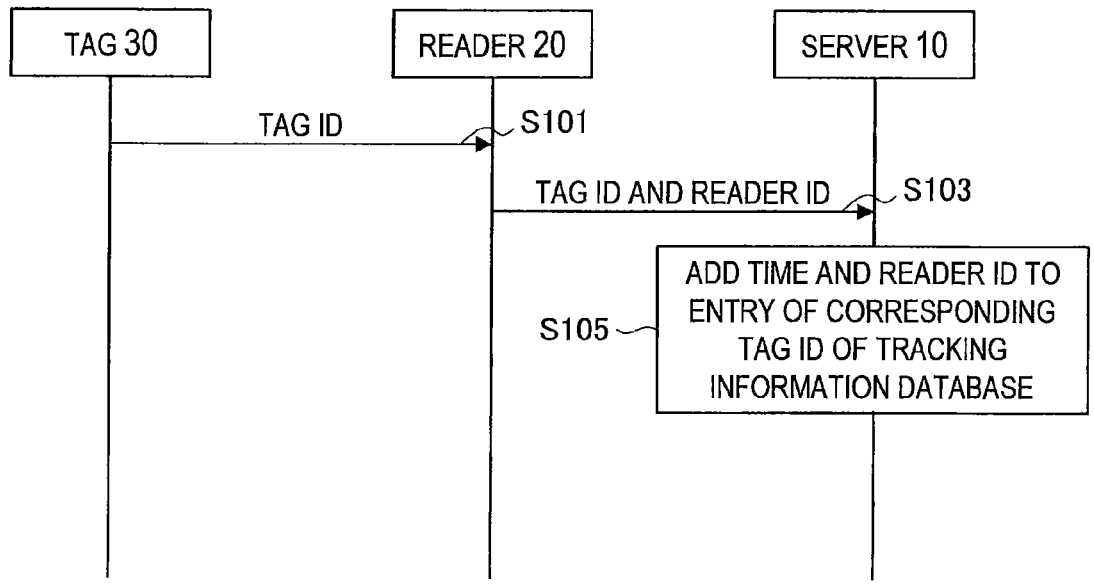
FIG. 11 is a sequence diagram showing an example of an operation of generating the tracking information of the wireless tag tracking system according to the embodiment.
Figure 12:
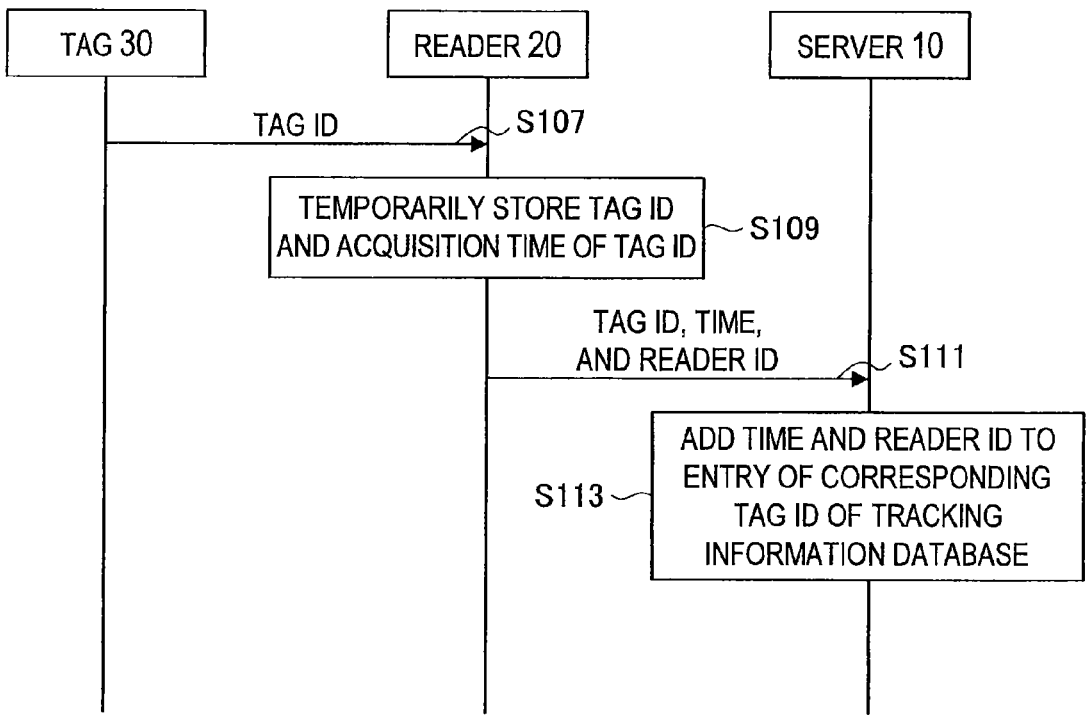
FIG. 12 is a sequence diagram showing another example of the operation of generating the tracking information of the wireless tag tracking system according to the embodiment.

In this case, an operation of generating the tracking information according to the embodiment of the present disclosure will be described with reference to FIGS. 11 and 12. FIG. 11 is a sequence diagram showing an example of an operation of generating the tracking information of the wireless tag tracking system according to the embodiment. FIG. 12 is a sequence diagram showing another example of the operation of generating the tracking information of the wireless tag tracking system according to the embodiment.

First, referring to FIG. 11, if the reader 20 detects that there is the tag 30 in a communication range of the reader 20, the reader 20 acquires the tag ID from the tag 30 (S101). Immediately after acquiring the tag ID, the reader 20 adds the reader ID to identify the reader 20 to the acquired tag ID and transmits the tag ID and the reader ID to the server 10 (S103). The tracking information generating unit 111 of the server 10 that receives the tag ID and the reader ID from the reader 20 adds a time when the tag ID and the reader ID are received and the reader ID to an entry of the received tag ID, among the tracking information stored in the tracking information DB 55 (S105).

According to the operation of generating the tracking information shown in FIG. 11, the reader 20 transmits the tag ID and the reader ID to the server 10 immediately after acquiring the tag ID. In this case, the acquisition time of the tag ID may not be stored by the side of the reader 20. When a failure is generated in communication between the reader 20 and the server 10 and the tag ID and the reader ID may not be immediately transmitted to the server 10, the difference is generated between a time when the reader 20 acquires the tag ID and a time when the server 10 receives the tag ID. Therefore, in this case, the reader 20 may not know an accurate time when the tag ID is acquired.

Therefore, an example of the case in which the reader 20 stores the acquisition time of the tag ID will be described using FIG. 12. When the reader 20 stores the acquisition time of the tag ID, the reader 20 may not transmit the tag ID to the server 10 immediately after acquiring the tag ID.

If the reader 20 detects that there is the tag 30 in a communication range of the reader 20, the reader 20 acquires the tag ID from the tag 30 (S107). The reader 20 associates the tag ID and the acquisition time of the tag ID and temporarily stores the tag ID and the acquisition time in the storage unit 203. The reader 20 transmits the tag ID, the acquisition time of the tag ID, and the reader ID to the server 10 (S111). At this time, the reader 20 may collect the plurality of tag IDs and transmit the plurality of tag IDs to the server 10. The tracking information generating unit 111 of the server 10 that receives the tag ID adds a reception time of the tag ID and the reader ID to an entry of the received tag ID among the tracking information stored in the tracking information DB 55 (S113).

The tracking information that is generated as shown in FIGS. 11 and 12 is referred to by the user who is permitted to track the wireless tag 30. At this time, the user who is permitted to track the wireless tag 30 is a user that is associated with the wireless tag 30 and is registered in the tracking information shown in FIG. 8.

Next, provision of the tracking information to the user will be described.

[2-3. Display of Tracking Information]

Figure 13:
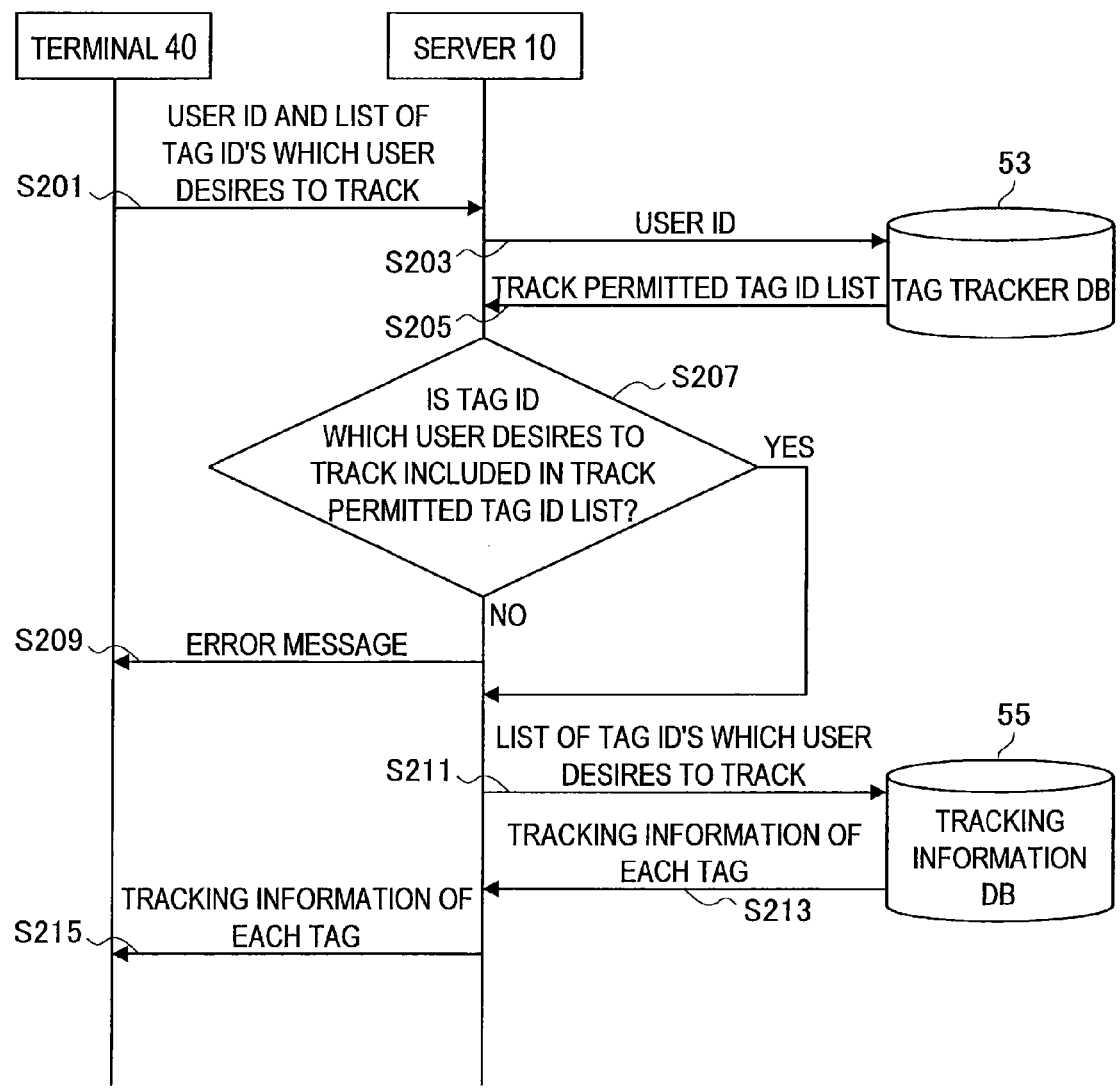
FIG. 13 is a sequence diagram showing an example of an operation of providing the tracking information of the wireless tag tracking system according to the embodiment.
Figure 14:
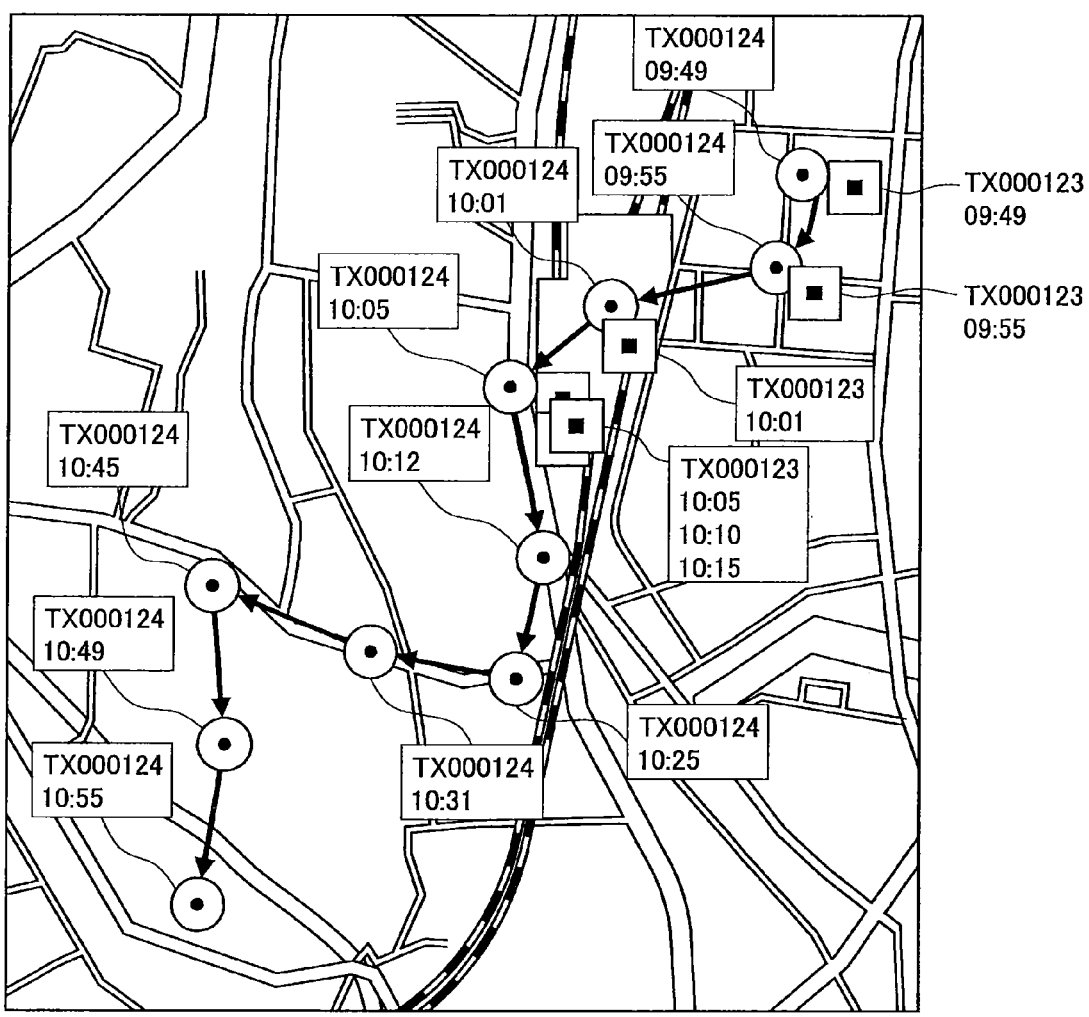
FIG. 14 is a diagram showing a display example of the tracking information of the wireless tag tracking system according to the embodiment.
Figure 15:
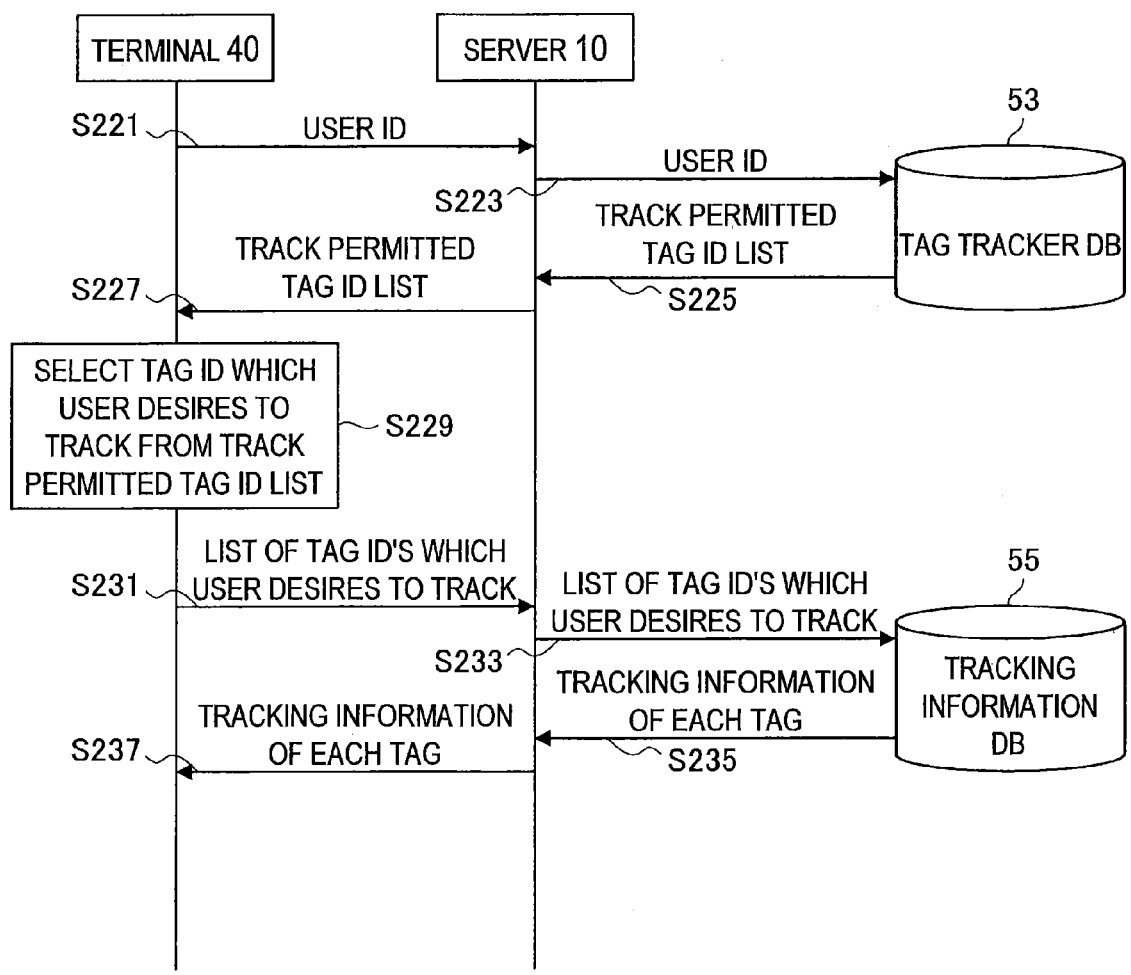
FIG. 15 is a sequence diagram showing another example of the operation of providing the tracking information of the wireless tag tracking system according to the embodiment.

Next, a display operation of the tracking information according to the embodiment of the present disclosure will be described with reference to FIGS. 13 to 15. FIG. 13 is a sequence diagram showing an example of an operation of providing the tracking information of the wireless tag tracking system according to the embodiment. FIG. 14 is a diagram showing a display example of the tracking information of the wireless tag tracking system according to the embodiment. FIG. 15 is a sequence diagram showing another example of the operation of providing the tracking information of the wireless tag tracking system according to the embodiment.

First, referring to FIG. 13, the user transmits the user ID and a list of the tag IDs of the wireless tags which the user desires to track to the server 10, using the terminal 40 (S201). At this time, the user may transmit information of a reference period of the tracking information to the server 10. The tracking information display control unit 113 of the server 10 uses the user ID received from the terminal 40 (S203) and acquires the list of the tag IDs of the wireless tags that are registered to permit the user identified by the user ID to track the wireless tags, from the tag tracker DB 53 (S205).

The tracking information display control unit 113 determines whether the tag IDs of the tag ID list which is received from the terminal 40 and which the user desires to track are included in the list of the tag IDs of the wireless tags that are registered to permit the user to track the wireless tags (S207). By the determination of step S207, when it is determined that the tag IDs of the wireless tags which the user desires to track are not registered to permit the user to track the wireless tags, the tracking information display control unit 113 returns an error message to the terminal 40 (S209). Meanwhile, by the determination of step S207, when it is determined that the tag IDs of the wireless tags which the user desires to track are registered to permit the user to track the wireless tags, the tracking information display control unit 113 acquires tracking information of each tag from the tracking information DB 55 (S213) based on the list of the tag IDs of the wireless tags which the user desires to track (S211). The tracking information display control unit 113 provides a display screen on which the tracking information of each tag is displayed to the terminal 40 (S215). When the user sets the reference period of the tracking information, the tracking information display control unit 113 can acquire the tracking information of the set period in step S213.

Various methods of providing the tracking information from the tracking information display control unit 113 to the user are considered. For example, as shown in FIG. 14, a position of the tag of the tracking information may be provided to overlap the map. Referring to an example of FIG. 14, tracking information of two wireless tags 30 that have tag IDs "TX000123" and "TX000124" is shown. When the user loses a possession to which the wireless tag 30 having the tag ID "TX000124" is attached, the user refers to tracking information during a period in which the user loses the possession. By referring to the tracking information, the user can know a current position of the lost possession.

FIG. 15 shows a modification of the display operation of the tracking information. In this case, first, the user transmits the user ID to the server 10 using the terminal 40 (S221). The tracking information display control unit 113 of the server 10 that receives the user ID uses the user ID (S223) and acquires the list of the tag IDs of the wireless tags that are registered to permit the user identified by the user ID to track the wireless tags, from the tag tracker DB 53 (S225). The tracking information display control unit 113 provides a display screen including the acquired list of the tag IDs of the wireless tags that are registered to permit the user to track the wireless tags, to the terminal 40 (S227).

The user selects the tag IDs of the wireless tags which the user desires to track from the provided display screen using the terminal 40 (S229). The terminal 40 transmits the list of the tag IDs of the wireless tags which are selected in step S229 and which the user desires to track to the server 10 (S231). The tracking information display control unit 113 of the server 10 that receives the list of the tag IDs of the wireless tags which the user desires to track uses the list of the tag IDs of the wireless tags which the user desires to track (S233) and acquires the tracking information of each tag included in the list from the tracking information DB 55 (S235). The tracking information display control unit 113 provides a display screen including the tracking information of each of the acquired tags to the terminal 40 (S237).

The provision of the tracking information to the user has been described. When the user attaches the wireless tag 30 to the user's possession, the user can use the tracking information to know the current position when the user loses the possession. For example, if the user refers to the tracking information of the wireless tag 30 attached to a child or a possession of the child, the user can know a current position of the child.

[2-4. Inspection of Tag Information]

Figure 16:
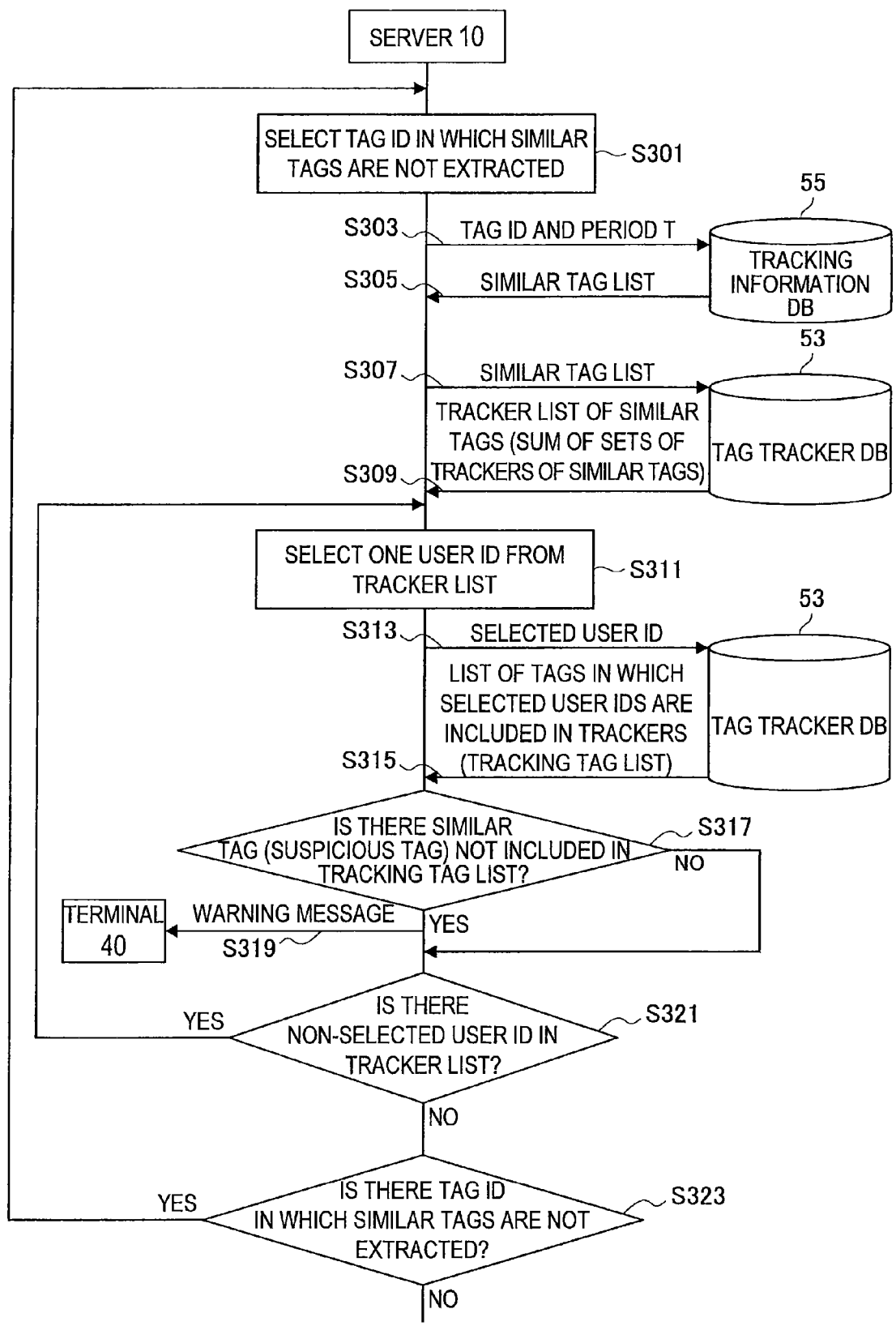
FIG. 16 is a flowchart showing an operation example of information extraction processing for extracting a user suspected as an unjust tracker by the server of the wireless tag tracking system according to the embodiment.
Figure 25:
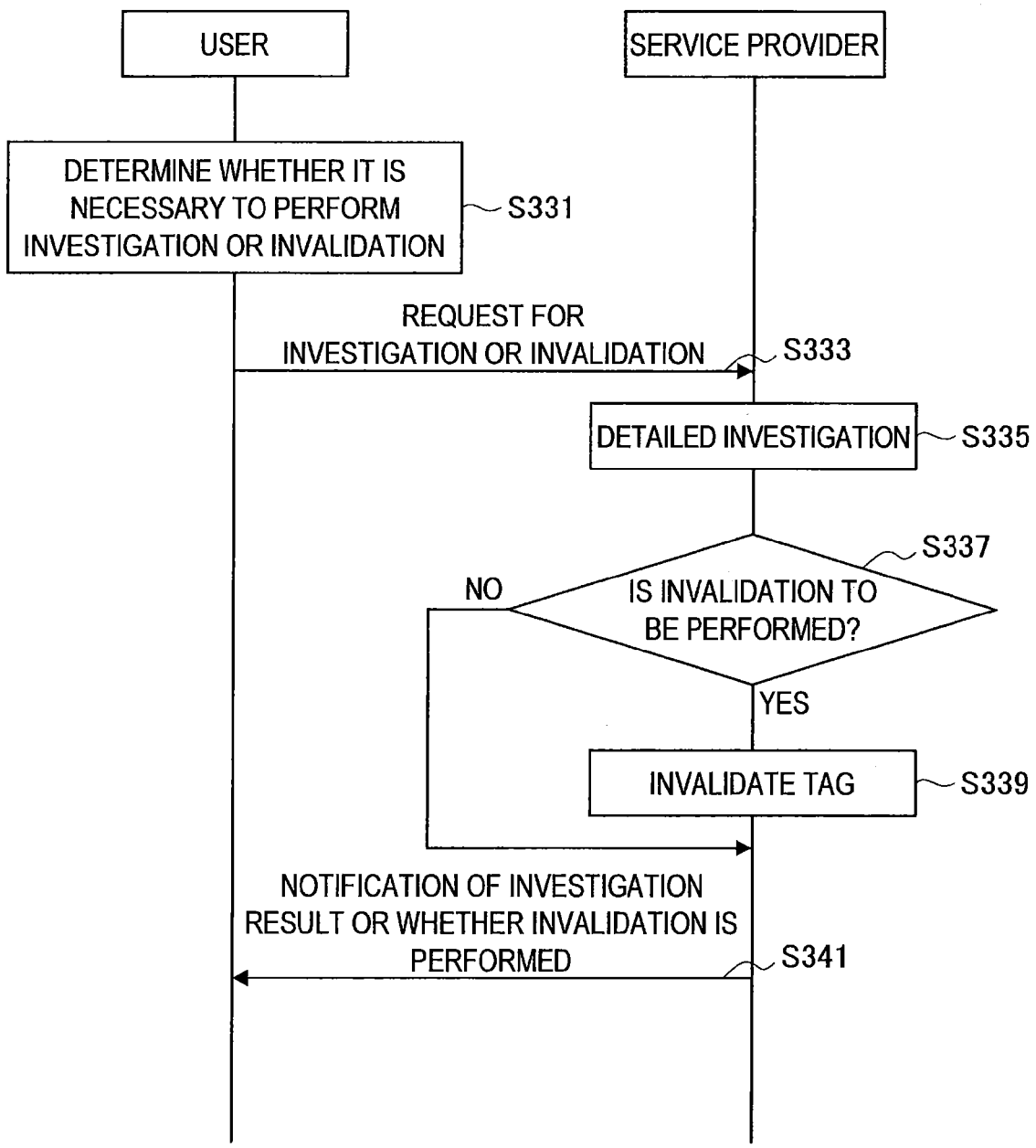
FIG. 25 is a sequence diagram showing an example of processing with respect to a wireless tag attached by an unjust tracker to be extracted by the wireless tag tracking system according to the embodiment.

Next, the inspection of the tag information according to the embodiment of the present disclosure will be described with reference to FIGS. 16 and 25. FIG. 16 is a flowchart showing an operation example of information extraction processing for extracting a user suspected as an unjust tracker by the server of the wireless tag tracking system according to the embodiment. FIG. 17 is a diagram showing an example of a similar tag list extracted in step S305 of FIG. 16. FIG. 18 is a diagram showing an example of a tracker list extracted in step S309 of FIG. 16. FIG. 19 is a diagram showing an example of a tracking tag list extracted in step S315 of FIG. 16. FIG. 20 is a diagram showing an example of a list of similar tags that are not included in a tracking tag list extracted in step S317 of FIG. 16. FIG. 21 is a diagram showing another example of the tracking tag list extracted in step S315 of FIG. 16. FIG. 22 is a diagram showing another example of the list of similar tags that are not included in the tracking tag list extracted in step S317 of FIG. 16. FIG. 23 is a diagram showing another example of the tracking tag list extracted in step S315 of FIG. 16. FIG. 24 is a diagram showing another example of the list of similar tags that are not included in the tracking tag list extracted in step S317 of FIG. 16. FIG. 25 is a sequence diagram showing an example of processing with respect to a wireless tag attached by an unjust tracker to be extracted by the wireless tag tracking system according to the embodiment.

First, the inspection of the tag information according to the embodiment of the present disclosure will be described with reference to FIG. 16. The information inspecting unit 115 of the server 10 selects the tag ID of the wireless tag 30 on which the processing of extracting the similar tags is not executed (S301). The information inspecting unit 115 generates a list of similar tags in which tracking information is similar during a period T, using the tracking information of the tracking information DB 55 (S305), based on the tag ID of the selected wireless tag 30 and the period T (S303).

The tracking information of the plurality of wireless tags 30 that are attached to the same person or a plurality of possessions which the same person usually carries is similar. Therefore, the information inspecting unit 115 extracts the wireless tags 30 having the similar tracking information and generates a similar tag list. The wireless tags 30 that are identified by the plurality of tag IDs included in the similar tag list may be attached to the same person or the possessions of the same person. For example, when the similar tag list is generated, an algorithm to calculate similarity degrees of character strings or DNA arrangements may be used. For example, a Levenshtein distance may be used. The information inspecting unit 115 calculates similarity degrees between the wireless tags 30, sequentially adds the tag IDs of the wireless tags 30 of which the similarity degrees are more than a predetermined threshold value to the list, and can generate the similar tag list. An example of the similar tag list that is generated using the tracking information of FIG. 9 is shown in FIG. 17.

The information inspecting unit 115 generates a list of the users (tracker list) registered as the trackers of the plurality of wireless tags 30 included in the similar tag list, using the information of the tag tracker DB 53 (S309), based on the generated similar tag list (S307). At this time, the information inspecting unit 115 may calculate a sum of sets of the trackers of the wireless tags 30 and generate a tracker list.

For example, an example of the tracker list that is generated using the similar tag list of FIG. 17 and the tracker information of FIG. 8 is shown in FIG. 18. Referring to the similar tag list of FIG. 17, five tag IDs of "TX000123, TX000124, TX000133, TX000150, and TX000244" are included in the similar tag list. Generation of the tracker list in this example is described. Referring to FIG. 8, a tracker that is associated with the tag ID "TX000123" is "aa001101." A tracker who is associated with the tag ID "TX000124" is "aa001101." Likewise, a tracker who is associated with the tag ID "TX000133" is "aa001101." A tracker who is associated with "TX000150" is "ee009909" and trackers who are associated with "TX000244" are "bb001202 and aa001101." In this case, if the sum of the sets of the extracted trackers is calculated, the tracker list includes the user IDs "aa001101, ee009909, and bb001202," as shown in FIG. 18.

Therefore, the information inspecting unit 115 can acquire the tracker list shown in FIG. 18 after step S309. In this case, the information inspecting unit 115 selects one user ID from the tracker list (S311). The information inspecting unit 115 uses the selected user ID (S313) and generates a list of the tags (tracking tag list) in which the user IDs selected from the tag tracker DB 53 are included in the trackers (S315).

For example, in an example of FIG. 18, first, the information inspecting unit 115 selects one user ID "aa001101" from the tracker list. The information inspecting unit 115 refers to the tag tracker DB 53 and extracts the tag IDs of the wireless tags 30 in which the user ID "aa001101" is registered as the tracker. If the example of FIG. 8 is used, the wireless tags 30 in which the user ID "aa001101" is registered as the tracker are "TX000123, TX00124, TX000133, TX000244, TX000321, and TX000322." A tracking tag list with respect to the user ID "aa001101" is shown in FIG. 19.

In this case, the information inspecting unit 115 compares the tracking tag list generated in step S315 and the similar tag list generated in step S305. The information inspecting unit 115 determines whether there is a similar tag not included in the tracking tag list (S317). For example, if the tracking tag list of FIG. 19 and the similar tag list of FIG. 17 are compared, a non-tracking tag list that is a list of similar tags not included in the tracking tag list is generated as shown in FIG. 20. As such, when there is the wireless tag 30 included in the non-tracking tag list, the information inspecting unit 115 transmits a warning message to the user having the selected user ID (S319). The warning message may be displayed on a page dedicated for the user. When the e-mail address is registered in the user information, the warning message may be transmitted to the user by transmitting an e-mail to the registered e-mail address. Alternatively, when the address of the user is registered in the user information, the warning message may be transmitted to the user by transmitting a mail to the registered address.

Next, the information inspecting unit 115 determines whether there is a non-selected user ID in the tracker list (S321). When there is the non-selected user ID in the tracker list, the information inspecting unit 115 repeats the processing of steps S311 to S319 according to the number of user IDs. Referring to FIG. 18, because the user IDs "ee009909" and "bb001202" are not selected, one user ID is selected from the two user IDs. For example, if the processing of steps S311 to S319 is executed with respect to the user ID "ee009909," the tracking tag list shown in FIG. 21 and the non-tracking tag list shown in FIG. 22 are generated. If the processing of steps S311 to S319 is executed with respect to the user ID "bb001202," the tracking tag list shown in FIG. 23 and the non-tracking tag list shown in FIG. 24 are generated.

Therefore, in this case, the warning message is transmitted to all of the user IDs "aa001101, ee009909, and bb001202" (that is, the businessman A, the stalker E, and the company B). The tag IDs "TX000123, TX00124, TX000133, TX000150, and TX000244" that are included in the similar tag list of FIG. 17 are actually the tag IDs of the wireless tags 30 that are attached to the businessman A and the possessions of the businessman A. The wireless tags 30 "TX000123, TX00124, and TX000133" among the wireless tags 30 are the tag IDs of the wireless tags 30 that are contracted by the businessman A and attached to the possessions of the businessman A. The wireless tag 30 that has the tag ID "TX000244" is the wireless tag 30 that is distributed from the company B to the businessman A. The wireless tag 30 that has the tag ID "TX000150" is the wireless tag 30 that is attached illegally to the businessman A by the stalker E. The information inspecting unit 155 executes the processing described above, does not track the person to which the wireless tag having the tag ID "TX000150" is attached, and can extract the wireless tag having the tag ID "TX000150" as the suspicious tag that may be the illegally used wireless tag not recognized by the person to whom the wireless tag is attached.

Next, processing after transmitting the warning message in step S319 of FIG. 16 will be described with reference to FIG. 25. The user who receives the warning message determines whether it is necessary to investigate or invalidate the targeted wireless tag 30 (S331). The user can transmit an investigation request or an invalidation request for the targeted wireless tag 30, according to necessity (S333).

For example, in the above example, because the possibility of the wireless tag 30 of which the businessman A is unaware being attached to the businessman A is high, the possibility of the businessman A transmitting an investigation request or an invalidation request is high. Because the possibility of a member of the company B attaching the wireless tag 30 having no concern with the company is very high, the possibility of the company B not transmitting an investigation request or an invalidation request is high. Because the company B does not know the facts even when the company B receives the warning message, the company B may previously request a service provider not to transmit the warning message. The possibility of the stalker E not transmitting an investigation request or an invalidation request is very high. This is because the possibility of a stalker's act being discovered becomes high when a detailed investigation is carried out.

Therefore, in step S333, if the businessman A transmits an investigation request or an invalidation request for the wireless tag having the tag ID "TX000150," the service provider performs the detailed investigation with respect to the wireless tag 30 (S335). For example, if the service provider notifies the stalker "ee009909," who is the possessor of the wireless tag having the tag ID "TX000150," that an invalidation of the wireless tag is scheduled and no formal objection is given within a designated period, the service provider can invalidate the wireless tag (wireless tag attached to the businessman A by the stalker E) having the tag ID "TX000150." As such, the service provider determines whether the wireless tag 30 is invalidated based on the investigation result (S337). When it is determined that the wireless tag 30 is invalidated, the service provider invalidates the corresponding wireless tag 30 (S339). The service provider notifies the user transmitting an investigation request or an invalidation request of the investigation result or invalidation or lack thereof (S341).

<3. Wireless Tag Confirmation Box>

Figure 26:
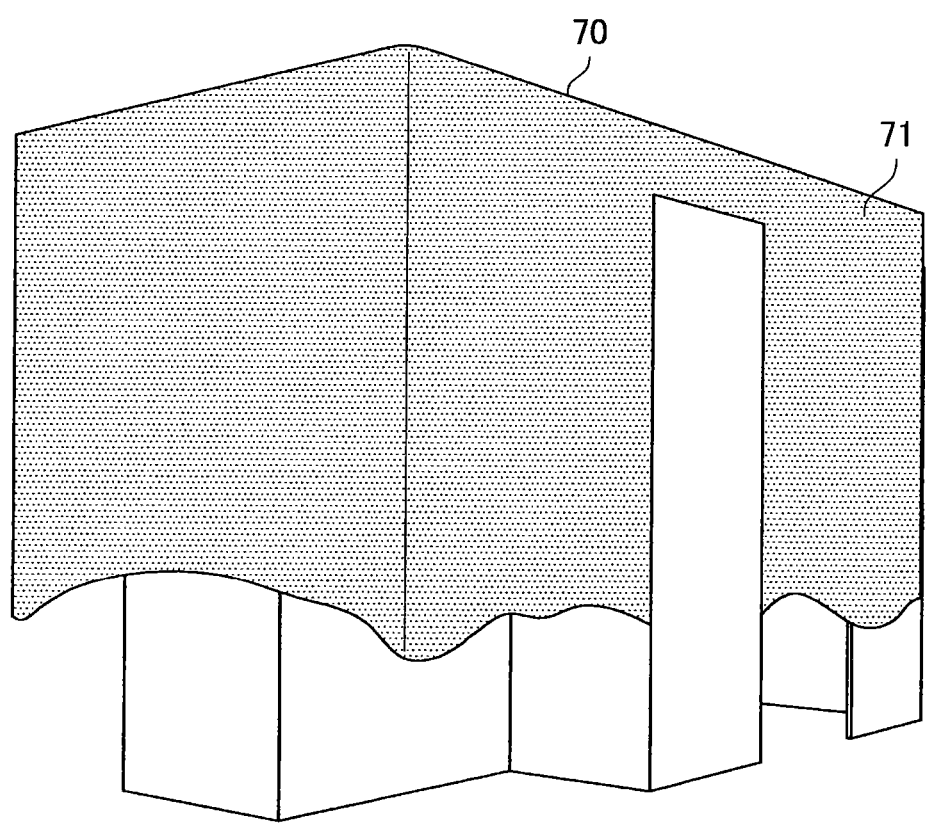
FIG. 26 is a diagram showing an example of the exterior of a wireless tag confirmation box in the embodiment.
Figure 27:
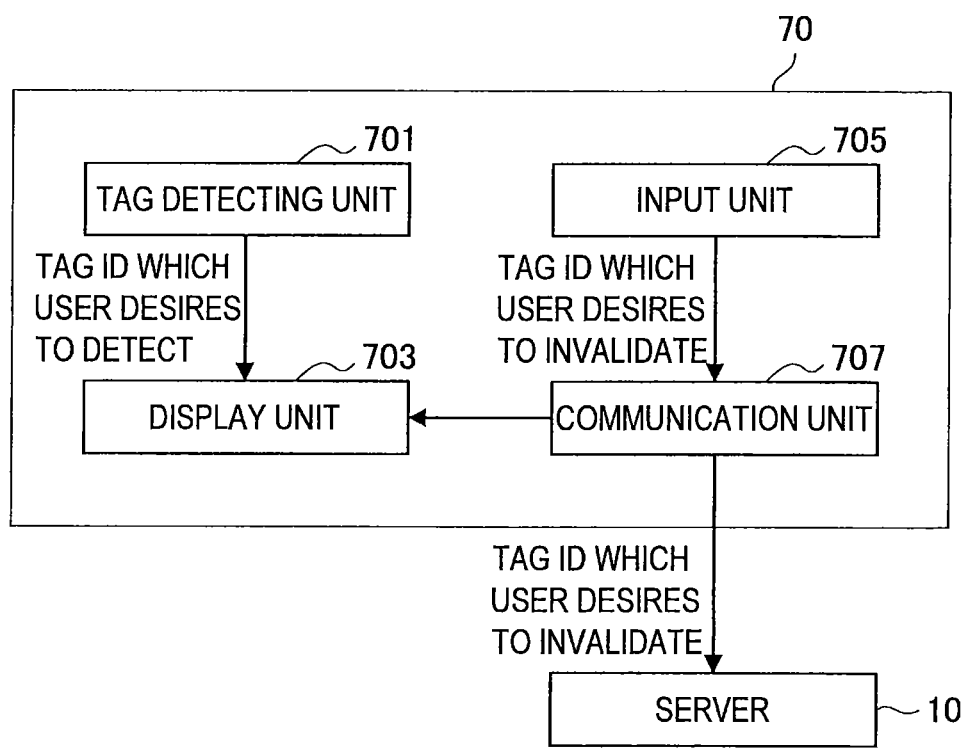
FIG. 27 is a block diagram showing a configuration of the wireless tag confirmation box in the embodiment.

A wireless tag confirmation box that enables the user to simply confirm whether the wireless tag 30 not recognized by the user is attached to the body of the user may be provided. The wireless tag confirmation box will be described with reference to FIGS. 26 and 27. FIG. 26 is a diagram showing an example of the exterior of the wireless tag confirmation box in the embodiment. FIG. 27 is a block diagram showing a configuration of the wireless tag confirmation box in the embodiment.

A wireless tag confirmation box 70 has a shape that can provide a limited space in which a sensor to detect whether there is the wireless tag 30 is arranged, as shown in FIG. 26. For example, the wireless tag confirmation box 70 is preferably provided with a shielding unit 71 to detect only the wireless tag 30 in a shielded space.

Referring to FIG. 27, the wireless tag confirmation box 70 has a tag detecting unit 701, a display unit 703, an input unit 705, and a communication unit 707.

The tag detecting unit 701 is a reader that detects the wireless tag 30. The tag detecting unit 701 can detect the wireless tag 30 in the shielding unit 71 of the wireless tag confirmation box 70. The tag detecting unit 701 can provide a tag ID of the detected tag to the display unit 703.

The display unit 703 can display the wireless tag 30 that is detected by the tag detecting unit 701. The display unit 703 may be a display device such as a liquid crystal display (LCD) device and an organic light emitting diode (OLED) display device.

The input unit 705 has a function of generating an input signal to perform a desired operation by a user. The input unit 705 may include a device, such as a touch panel, a mouse, a keyboard, a button, a microphone, a switch, and a lever, which is used when the user inputs information, and an input control circuit that generates an input signal based on an input from the user and outputs the input signal to a central processing unit (CPU). The user can select the wireless tag 30 which the user desires to invalidate among the wireless tags 30 displayed on the display unit 703 using the input unit 705.

The communication unit 707 can transmit and receive information between the server 10 and the communication unit 707. For example, the communication unit 707 may transmit the tag ID of the wireless tag 30 selected by the user using the input unit 705 to the server 10. Alternatively, the communication unit 707 may transmit a message to inquire of the server 10 about a possessor of the selected wireless tag 30. The communication unit 707 may receive the inquiry result and display the inquiry result on the display unit 703.

The preferred embodiments of the present disclosure have been described in detail with reference to the appended drawings. However, a technical range of the present disclosure is not limited to the above examples. It will be apparent to those skilled in the art that various modifications and changes can be made without departing from the technical scope and spirit defined by the appended claims. Therefore, it should be understood that the various modifications and changes are included in the technical range of the present disclosure.

For example, in the embodiment described above, the information inspecting unit 115 generates the similar tag list. However, the present disclosure is not limited to the above example. A part of the functions of the server 10 may be realized in a device different from the server 10. In this case, the server 10 can acquire the generated similar tag list from an external device.

In the present disclosure, the steps that are described in the flowcharts and the sequence diagrams include the processing that is executed in time series according to the order described in the present disclosure and the processing that is not executed in the time series but executed in parallel or individually. In the steps that are executed in the time series, the order may be appropriately changed as necessary.

Additionally, the present technology may also be configured as below.

(1) An information processing apparatus including:
   a similar tag list acquiring unit that acquires a similar tag list from which wireless tags having similar tracking information are extracted;
   a tracker extracting unit that extracts users permitted to access information of the wireless tags included in the similar tag list;
   a determining unit that determines whether a suspicious tag, which is a wireless tag included in the similar tag list that does not permit the user to access the information of the wireless tag, is included, with respect to each of the extracted users; and
   a notifying unit that transmits a notification to the user for whom it is determined that the suspicious tag is included in the similar tag list.

(2) The information processing apparatus according to (1), further including:
   a receiving unit that receives an investigation request or an invalidation request for the suspicious tag, from the user receiving the notification from the notifying unit.

(3) The information processing apparatus according to (1) or (2), further including:
   an invalidating unit that invalidates the suspicious tag which is designated.

(4) The information processing apparatus according to any one of (1) to (3),
   wherein the tracking information is movement history information of the wireless tag that is generated based on a time at which, using a reader for reading a tag ID which identifies the wireless tag, the tag ID is acquired, the acquired tag ID, and a reader ID which identifies the reader that has acquired the tag ID.

(5) An information processing method including:
   acquiring a similar tag list from which wireless tags having similar tracking information are extracted;
   extracting users permitted to access information of the wireless tags included in the similar tag list;
   determining whether a suspicious tag, which is a wireless tag included in the similar tag list that does not permit the user to access the information of the wireless tag, is included, with respect to each of the extracted users; and
   transmitting a notification to the user for whom it is determined that the suspicious tag is included in the similar tag list.

(6) A program for causing a computer to function as an information processing apparatus including:
   a similar tag list acquiring unit that acquires a similar tag list from which wireless tags having similar tracking information are extracted;
   a tracker extracting unit that extracts users permitted to access information of the wireless tags included in the similar tag list;
   a determining unit that determines whether a suspicious tag, which is a wireless tag included in the similar tag list that does not permit the user to access the information of the wireless tag, is included, with respect to each of the extracted users; and
   a notifying unit that transmits a notification to the user for whom it is determined that the suspicious tag is included in the similar tag list.

(7) A computer readable recording medium that records a program for causing a computer to function as an information processing apparatus including:
   a similar tag list acquiring unit that acquires a similar tag list from which wireless tags having similar tracking information are extracted;
   a tracker extracting unit that extracts users permitted to access information of the wireless tags included in the similar tag list;
   a determining unit that determines whether a suspicious tag, which is a wireless tag included in the similar tag list that does not permit the user to access the information of the wireless tag, is included, with respect to each of the extracted users; and
   a notifying unit that transmits a notification to the user for whom it is determined that the suspicious tag is included in the similar tag list.

(8) An information processing system including:
   wireless tags that maintain tag identifiers for identifying the wireless tags;
   a reader that acquires the tag identifier when there is the wireless tag within a predetermined range; and
   an information processing apparatus that inspects information of the wireless tag based on tracking information showing a movement history of the wireless tag generated using a time at which the tag identifier is acquired by the reader,
   wherein the information processing apparatus includes
     a similar tag list acquiring unit that acquires a similar tag list from which wireless tags having similar tracking information are extracted,
     a tracker extracting unit that extracts users permitted to access information of the wireless tags included in the similar tag list,
     a determining unit that determines whether a suspicious tag, which is a wireless tag included in the similar tag list that does not permit the user to access the information of the wireless tag, is included, with respect to each of the extracted users, and
     a notifying unit that transmits a notification to the user for whom it is determined that the suspicious tag is included in the similar tag list.

The present disclosure contains subject matter related to that disclosed in Japanese Priority Patent Application JP 2011-162166 filed in the Japan Patent Office on Jul. 25, 2011, the entire content of which is hereby incorporated by reference.

What is claimed is:
1. An information processing apparatus comprising:
   a similar tag list acquiring unit that acquires a similar tag list from which wireless tags having similar tracking information are extracted;
   a tracker extracting unit that extracts users permitted to access information of the wireless tags included in the similar tag list;

a determining unit that determines whether a suspicious tag, which is a wireless tag included in the similar tag list that does not permit the user to access the information of the wireless tag, is included, with respect to each of the extracted users; and a notifying unit that transmits a notification to the user for whom it is determined that the suspicious tag is included in the similar tag list.

2. The information processing apparatus according to claim 1, further comprising:

a receiving unit that receives an investigation request or an invalidation request for the suspicious tag, from the user receiving the notification from the notifying unit.

3. The information processing apparatus according to claim 1, further comprising:

an invalidating unit that invalidates the suspicious tag which is designated.

4. The information processing apparatus according to claim 1, wherein the tracking information is movement history information of the wireless tag that is generated based on a time at which, using a reader for reading a tag ID which identifies the wireless tag, the tag ID is acquired, the acquired tag ID, and a reader ID which identifies the reader that has acquired the tag ID.

5. An information processing method comprising:

acquiring a similar tag list from which wireless tags having similar tracking information are extracted;

extracting users permitted to access information of the wireless tags included in the similar tag list;

determining whether a suspicious tag, which is a wireless tag included in the similar tag list that does not permit the user to access the information of the wireless tag, is included, with respect to each of the extracted users; and transmitting a notification to the user for whom it is determined that the suspicious tag is included in the similar tag list.

6. A program for causing a computer to function as an information processing apparatus including:

a similar tag list acquiring unit that acquires a similar tag list from which wireless tags having similar tracking information are extracted;

a tracker extracting unit that extracts users permitted to access information of the wireless tags included in the similar tag list;

a determining unit that determines whether a suspicious tag, which is a wireless tag included in the similar tag list that does not permit the user to access the information of the wireless tag, is included, with respect to each of the extracted users; and a notifying unit that transmits a notification to the user for whom it is determined that the suspicious tag is included in the similar tag list.

7. A computer readable recording medium that records a program for causing a computer to function as an information processing apparatus including:

a similar tag list acquiring unit that acquires a similar tag list from which wireless tags having similar tracking information are extracted;

a tracker extracting unit that extracts users permitted to access information of the wireless tags included in the similar tag list;

a determining unit that determines whether a suspicious tag, which is a wireless tag included in the similar tag list that does not permit the user to access the information of the wireless tag, is included, with respect to each of the extracted users; and a notifying unit that transmits a notification to the user for whom it is determined that the suspicious tag is included in the similar tag list.

8. An information processing system comprising:

wireless tags that maintain tag identifiers for identifying the wireless tags;

a reader that acquires the tag identifier when there is the wireless tag within a predetermined range; and an information processing apparatus that inspects information of the wireless tag based on tracking information showing a movement history of the wireless tag generated using a time at which the tag identifier is acquired by the reader, wherein the information processing apparatus includes a similar tag list acquiring unit that acquires a similar tag list from which wireless tags having similar tracking information are extracted, a tracker extracting unit that extracts users permitted to access information of the wireless tags included in the similar tag list, a determining unit that determines whether a suspicious tag, which is a wireless tag included in the similar tag list that does not permit the user to access the information of the wireless tag, is included, with respect to each of the extracted users, and a notifying unit that transmits a notification to the user for whom it is determined that the suspicious tag is included in the similar tag list.

* * * * *